United States Patent
Sopco et al.

(10) Patent No.: US 9,143,487 B2
(45) Date of Patent: Sep. 22, 2015

(54) SYSTEM AND METHOD FOR MASSIVE CONTROLLED AND SECURED UPDATE OF DEVICES FIRMWARE

(71) Applicant: NEOPOST TECHNOLOGIES, Bagneux (FR)

(72) Inventors: Silviu Sopco, Poissy (FR); Seton Hodonou, Taverny (FR); Herve Bienaime, Fontenay aux Roses (FR); Nathalie Tortellier, Fontenay sous Bois (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 0 days.

(21) Appl. No.: 14/157,059

(22) Filed: Jan. 16, 2014

(65) Prior Publication Data

US 2014/0208114 A1    Jul. 24, 2014

(30) Foreign Application Priority Data

Jan. 18, 2013 (EP) .................................... 13305065

(51) Int. Cl.
*H04L 9/32* (2006.01)
*H04L 29/06* (2006.01)
*G06F 21/57* (2013.01)

(52) U.S. Cl.
CPC .......... *H04L 63/0435* (2013.01); *G06F 21/572* (2013.01)

(58) Field of Classification Search
CPC ........................... H04L 63/0435; G06F 21/572
USPC ........................................................ 713/171
See application file for complete search history.

(56) References Cited

U.S. PATENT DOCUMENTS

| | | | |
|---|---|---|---|
| 6,920,557 B2* | 7/2005 | Coffy et al. .................... | 713/159 |
| 7,222,228 B1* | 5/2007 | Stephens et al. .................. | 713/1 |
| 2003/0101446 A1* | 5/2003 | McManus et al. ............ | 717/178 |
| 2006/0200658 A1* | 9/2006 | Penkethman ...................... | 713/2 |
| 2008/0114990 A1* | 5/2008 | Hilbert et al. ................. | 713/189 |
| 2008/0141039 A1* | 6/2008 | Matze ............................ | 713/193 |
| 2008/0189702 A1 | 8/2008 | Morgan et al. | |
| 2011/0145789 A1* | 6/2011 | Rasch et al. .................. | 717/121 |

OTHER PUBLICATIONS

European Search Report of EP 13 30 5065 dated Mar. 28, 2013.

\* cited by examiner

*Primary Examiner* — Dant Shaifer Harriman
(74) *Attorney, Agent, or Firm* — Seed IP Law Group PLLC

(57) ABSTRACT

System for remote firmware updates of mail processing device from a remote data server including: file download servers connected to the remote data server for receiving encrypted files encrypted from a list of binary files corresponding to firmware of a mail processing device to update; web servers providing a web service application for downloading files and connected to the remote data server and the files download servers for retrieving the encrypted files associated with a personalized files catalog retrieved from the remote data server; and a user computer system connected to the web servers for receiving the encrypted files for download onto a storage device to plug into the mail processing device. The mail processing device decrypts the encrypted files with file decryption keys previously provided with the personalized files catalog and installs the files before connecting to the remote data server for report the outcome of the installation.

10 Claims, 2 Drawing Sheets

SYSTEM AND METHOD FOR MASSIVE CONTROLLED AND SECURED UPDATE OF DEVICES FIRMWARE

TECHNICAL FIELD

The present invention relates to the field of mail processing devices and more particularly to a remote system for updating the firmware of these devices.

PRIOR ART

In current dealer architecture, a remote server provides a variety of remote services for a park of mail processing devices, such as franking machines or inserters, including park monitoring and device feature management. In particular, the remote server can perform remote software updates of a device.

However, some difficulties result from this classical architecture and particularly for updating firmware in the field. Firstly, a remote firmware update is typically time and resource consuming. More particularly, multiple parallel firmware transfers during a massive remote update overload the remote server, thus impacting the remote server performance and preventing for example other mail processing devices from connecting to the remote server.

Moreover, in some cases, the device connection to the network is not reliable enough to support a remote firmware update. In such cases, the firmware update needs to be performed locally on the device by a maintenance department (via USB key for example) with the consequence that there is no control on the firmware installed in the device.

SUMMARY OF THE INVENTION

The present invention thus aims to eliminate the above disadvantages and to propose a method for supporting a remote firmware update of mail processing devices. Another object of the invention is to ensure control of the firmware of each mail processing device in the field. Yet another object is to ensure file transfer security during the firmware update.

According to a main feature of the invention, it is proposed the method for securely updating a firmware of a mail processing device from a remote data server, wherein binary files corresponding to the firmware of the mail processing device to update are encrypted and split for distributing to file download servers and wherein for retrieving, decrypting and installing said split encrypted binary files in the mail processing device, the mail processing device previously receives a personalized files catalogue including a list of said encrypted binary files with associated file addresses in said file download servers and file decryption keys, and once said split encrypted binary files installed and decrypted with said file decryption keys reports the outcome of the updating to the remote data server to control the firmware of the mail processing device.

With this unicast method, the remote data server defines and monitors, and therefore can control the firmware of each mail processing device in the field.

According to an embodiment
the remote data server prepares a list of binary files corresponding to the firmware of the mail processing device to update and encrypts them in order to distribute encrypted files to file download servers connected to the remote data server,
the remote data server prepares a personalized files catalogue including a files catalogue identification, said list of binary files, associated file addresses in said file download servers and file decryption keys in order to distribute said personalized files catalogue to the mail processing device,
the mail processing device retrieves from the file download servers the encrypted files, decrypts the files with the file decryption keys previously provided with the personalized files catalogue by the remote data server and installs the files, and
the mail processing device connects to the remote data server and reports the outcome of the updating.

According to another embodiment:
the remote data server prepares a list of binary files corresponding to a firmware of the mail processing device to update and encrypts them in order to distribute encrypted files to file download servers connected to the remote data server,
the remote data server prepares a personalized files catalogue including a files catalogue identification, said list of binary files, associated file addresses in said file download servers and file decryption keys in order to distribute said personalized files catalogue to the mail processing device,
a user computer system connects to web servers connected with both the remote data server and the files download servers and providing a web service application for downloading files and said files catalogue identification is entered into the web servers via this web service application for downloading files,
the web service application for downloading files requests and retrieves from the remote data server the personalized files catalogue corresponding to said files catalogue identification, without the file decryption keys,
the web service application for downloading files requests and retrieves from the file download servers the encrypted files corresponding to the personalized files catalogue,
the user receives on the user computer system the encrypted files for download onto a mass storage device and plugs the mass storage device into the mail processing device,
the mail processing device retrieves from the mass storage device the encrypted files, decrypts the files with the file decryption keys previously provided with the personalized files catalogue by the remote data server and installs the files, and
the mail processing device connects to the remote data server and reports the outcome of the updating.

Preferably, the web service application for downloading files packages said encrypted files into a single encrypted file to facilitate the download into the mass storage device.

Advantageously, the number of file download servers is multiplied as much as necessary to minimize the duration of the remote firmware updates and the file is signed by the remote data server to allow the mail processing device to authenticate the file and verify its integrity.

The invention also concerns a system for securely updating a firmware of a mail processing device from a remote data server comprising:
file download servers connected to the remote data server for receiving from the remote data server encrypted files encrypted from a list of binary files corresponding to a firmware of the mail processing device to update,
web servers providing a web service application for downloading files and connected both to the remote data server and the files download servers for retrieving the encrypted files associated with a personalized files catalogue retrieved from the remote data server, said files identification catalogue is entered into the web servers via this web service application for downloading files, a user computer system connected to the web servers for receiving the encrypted files for download onto a mass storage device to plug into the mail processing device, the mail processing device decrypting the encrypted files with file decryption keys previously provided with the personalized files catalogue by the remote data server and installing the files before to connecting to the remote data server for report the outcome of the installation.

Preferably, the personalized files catalogue includes a files catalogue identification, said list of binary files, associated file addresses in said file download servers and said file decryption keys.

According to a preferred embodiment, said mass storage device is a USB key and said mail processing device is a franking machine or an inserter.

BRIEF DESCRIPTION OF THE DRAWINGS

The invention will now be further explained and illustrated in the following description with reference to embodiments of the invention as shown in the accompanying drawings, in which.

DETAILED DESCRIPTION

Figure 1:
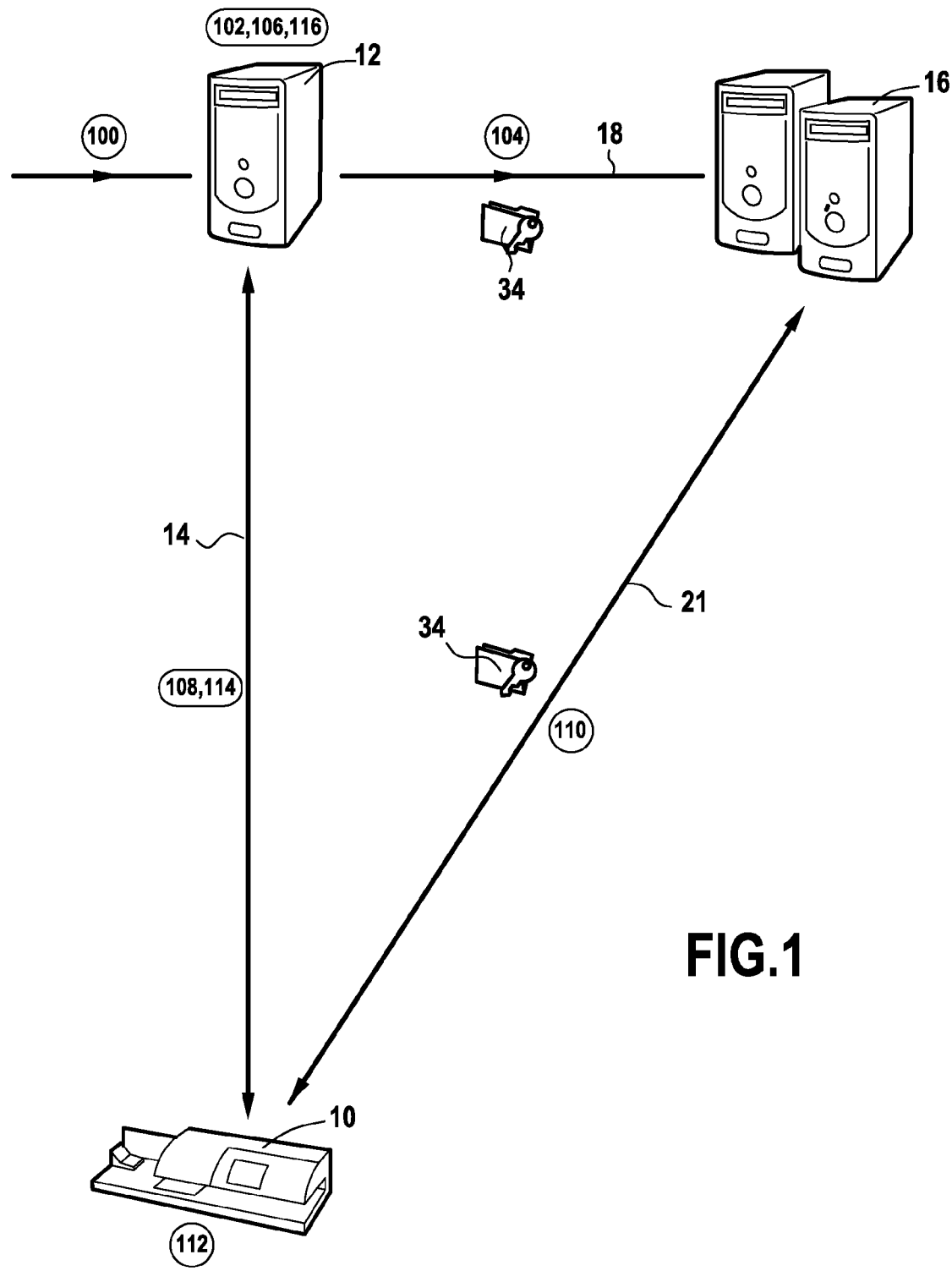
FIG. 1 illustrates a first embodiment of a mail processing system supporting a method of massive remote firmware update according to the invention.

FIG. 1 shows a mail processing device 10 installed in the field classically in connection with a remote data server 12 via a first communication channel 14. According to a first embodiment of the invention, the remote data server is also in connection with file download servers 16 via a second communication channel 18 and the file download servers are themselves in connection with the mail processing device 10 via a third communication channel 21.

The presence of several file download servers 16 in relation with the remote data server 12 is to split the different tasks covered by this remote data server for remote firmware updates and to add specific tasks to ensure a file transfer security and a control of the firmware of the mail processing devices. Such architecture improves in particular the scalability of the overall mail processing system.

The definition of firmware and the selection of the new firmware for update are controlled for each mail processing device in the field by the remote data server that distributes the binary files for the firmware updates to the different download servers.

The firmware of the whole park of mail processing devices is controlled and monitored by the remote data server. File transfer security is ensured via several mechanisms and mainly by the remote data server. For example, each file for firmware update is signed by the remote data server to allow for the device to authenticate that the file is a validated file and encrypted by the remote data server to ensure the confidentiality and integrity of the file transfer. The file signature is critical for preventing from the introduction of invalid (foreign) firmware into the devices.

According to this first embodiment, the invention operates as follows (the corresponding references appear on FIG. 1).

In a first step 100, new firmware files are uploaded onto the remote data server 12 and, in a second step 102, the remote data server prepares the binary files and encrypts them in order to distributes the encrypted binary files 34 (but without the corresponding file decryption keys to ensure the firmware file security) to the file download servers 16, in a third step 104.

Based on a supervisor input initiated by the dealer of the mail processing device 10, the remote data server 12 connects each mail processing device and verifies its firmware configuration (however, the remote data server may have retrieved this configuration in a previous connection) in order to prepare a personalized files catalogue for a selected group of mail processing devices having a same firmware configurations (extremely such group can be constituted by one device only), in a fourth step 106, for the firmware update of each device of such group of mail processing devices selected for the massive firmware update. The personalized files catalogue includes the list of files, the associated file addresses, the file decryption keys and the file catalogue identification.

The fifth step 108 takes place during the next regular connection (for example at the next power-on) of a mail processing device 10 within the specified group of devices and relates to the reception of the personalized files catalogue by the mail processing device 10 from the remote data server 12.

In a sixth step 110, the device requests and retrieves from the file download servers 16 the encrypted files 34 corresponding to the personalized files catalogue received from the remote data server 12.

In a seventh step 112, the mail processing device 10 decrypts the files with the file decryption keys provided with the personalized files catalogue and installs the files. Thus, the firmware of each mail processing device is updated as precisely requested by the remote data server without any possibility of local modifications by the user.

In the eighth step 114, the mail processing device 10 connects to the remote data server 12 and reports the outcome of the installation, which may eventually be a failure. In this case, the remote data server can immediately re-plan a new communication with the mail processing device for another firmware upgrading. And finally, in a ninth and final step 116, the remote data server 12 updates the status of the mail processing device firmware.

It must be noted that with the invention, each mail processing device is in an unicast communication with the remote data server and the communication for firmware update between the mail processing device 10 and the file download servers 16 is always initiated by the mail processing device and can therefore be planned for the concerned mail processing device. This mechanism prevents any external computer system from initiating communication with the mail processing device and accessing or altering information within the mail processing device.

Such architecture is not limited to firmware updates, but can also support other file downloads onto the devices associated with commercial upgrades or with the on-going operation of the devices (slogans, rate files . . . ).

Figure 2:
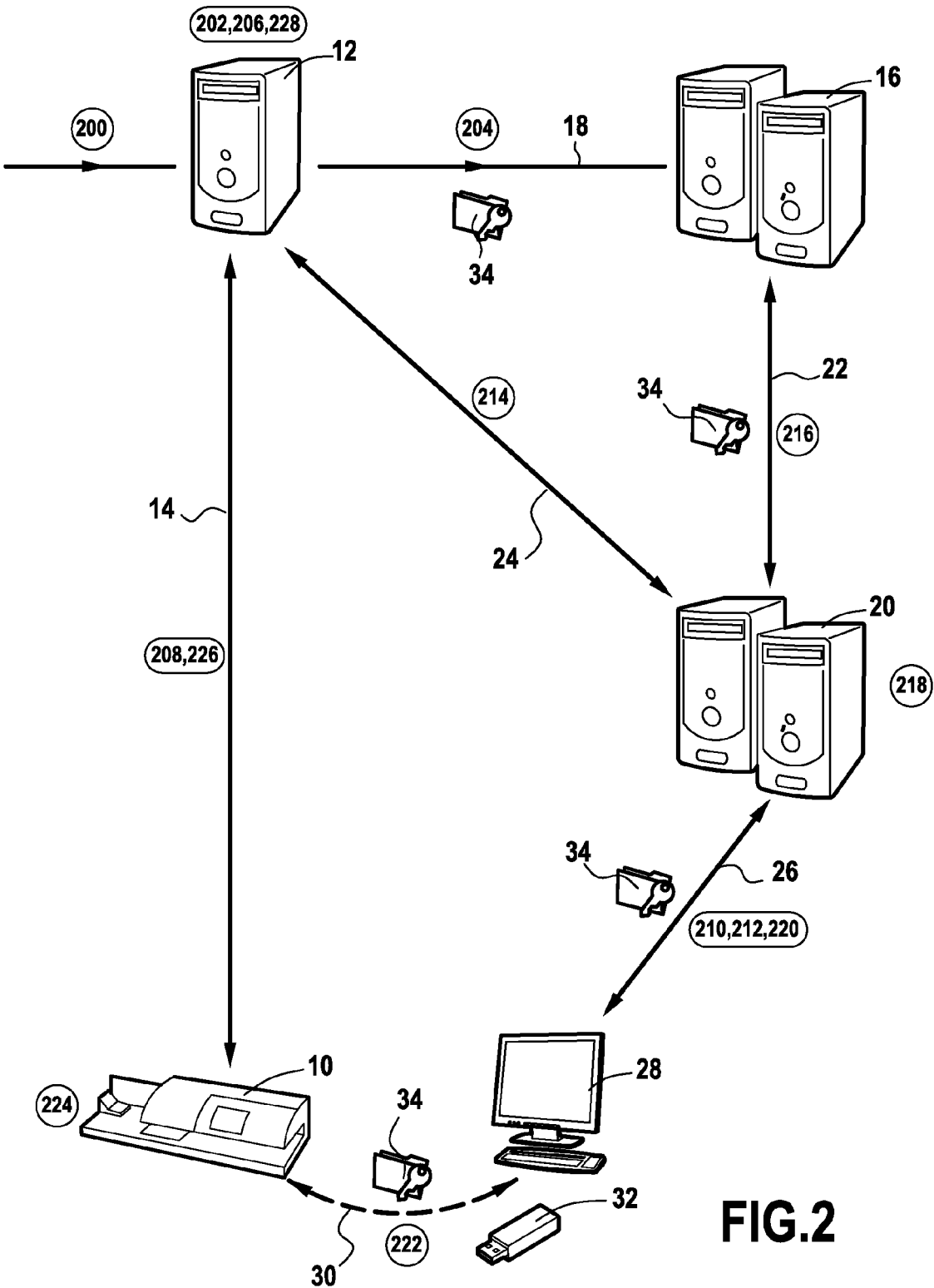
FIG. 2 illustrates a second embodiment of a mail processing system supporting a method of massive remote firmware update according to the invention.

According to a second embodiment of the invention illustrated on FIG. 2, the remote data server also can be in connection with file download servers 16 via the second communication channel 18 and file download servers are themselves in connection with web download application web servers 20 via a third communication channel 22. The web download application web servers 20 are in connection with the remote data server 12 via a fourth communication channel 24 and via a fourth communication channel 26 with a computer system 28 of a user of the mail processing device 10.

Furthermore, the device connection to the network being in general not reliable enough to support a remote firmware update, it is proposed to realize this update via file download onto a user or customer computer system, such as a personal computer, and manual file transfer 30 from this computer system 28 to the mail processing device 10 via a mass storage device 32.

More particularly, the customer needs to connect from one of his computer system 28 to a web server or group of web servers 20 providing the service application for downloading files. Previously, the remote data server had provided each web server with a personalized files catalogue including the list of encrypted binary files 34 and their corresponding addresses on the file download servers, but without a file decryption keys to ensure the firmware file security. The file decryption keys are only known by the remote data server and the mail processing devices. By identifying the personalized files catalogue, the customer receives the firmware files for download onto his mass storage device 32. Upon completion of the decrypting of the received files and reconstitution of the updated firmware in the mail processing device, the mail processing device reports its resulting firmware configuration to the remote data server. The number of file download servers can be multiplied as much as necessary to minimize the duration of a massive firmware update.

In some cases, several successive firmware updates are required for a device, for example when the targeted final firmware results from the successive evolutions of several firmware versions. In such a case, all the files for all the different firmware versions are downloaded onto the mass storage device so that the customer does have to perform several successive downloads on the mass storage device. Then, the device recognizes that several downloads are required and performs them successively from the mass storage device to install the targeted final firmware.

According to this second embodiment, the invention operates as follows (the corresponding references appear on FIG. 2).

In a first step 200, new firmware files are uploaded onto the remote data server 12 and, in a second step 202, the remote data server prepares the binary files and encrypts them in order to distributes the encrypted binary files 34 to the file download servers 16 (but without the corresponding file decryption keys to ensure the firmware file security), in a third step 204.

Based on a supervisor input initiated by the dealer of the mail processing device 10, the remote data server 12 connects the mail processing device and verifies its configuration in order to prepare a personalized files catalogue, in a fourth step 206, for the firmware update of each device of a group of mail processing devices selected for the massive firmware update. The personalized files catalogue includes the list of files, the associated file addresses, the file decryption keys and the file catalogue identification.

The fifth step 208 takes place during the next regular connection (for example at the next power-on) of a mail processing device 10 within the specified group of devices and relates to the reception of the personalized files catalogue by the mail processing device 10 from the remote data server 12.

In a sixth step 210, the customer connects from his computer system 28 to a web server or group of servers 20 providing the service application for downloading files (Web Download Application) and, in a seventh step 212, the customer enters the identification of the personalized files catalogue required for the firmware update of his mail processing device 10 via this web download application. This identification of the personalized files catalogue is thus made available to the customer on the mail processing device 10.

In an eighth step 214, the web download application requests and retrieves from the remote data server 12 the personalized files catalogue, which is provided to the web download application without the file decryption keys. If multiple successive firmware updates are scheduled by the remote data server for the mail processing device (for example when a complete firmware update requires several successive firmware installations), the web download application retrieves all the scheduled personalized files catalogues from the remote data server 12.

In a ninth step 216, the web download application requests and retrieves from the file download servers 16 the encrypted files 34 corresponding to the personalized files catalogue. When several personalized files catalogues, corresponding to multiple successive firmware updates, have been received from the remote data server 12 for the mail processing device 10, the web download application retrieves from the file download servers 16 all the corresponding encrypted files in one go.

In a tenth step 218, the web download application packages the encrypted files 34 into a single package to facilitate the transfer via the mass storage device 32. As previously, when several personalized files catalogues corresponding to multiple successive firmware updates have been received from the remote data server 12 for the mail processing device 10, the web download application packages the encrypted files 34 into several packages corresponding to the several personalized files catalogues.

In an eleventh step 220, the customer exports the files package(s) onto a mass storage device 32 via his computer system 28 and, in a twelfth step 222, the customer plugs the mass storage device 32 into the mail processing device 10. In a thirteenth step 224, the mail processing device 10 retrieves from the mass storage device 32 the encrypted files 34 corresponding to the personalized files catalogue, which the mail processing device 10 has previously received in step 208 from the remote data server 12, decrypts the files with the file decryption keys provided with the personalized files catalogue previously received from the remote data server and installs the files. When several packages corresponding to several personalized files catalogues are stored in the mass storage device 32, only the first package, corresponding to the personalized files catalogue, which the mail processing device has received from the remote data server, is retrieved by the mail processing device. The other packages remain available in the mass storage device for the next retrievals from the mail processing device.

In the fourteenth step 226, the mail processing device 10 connects to the remote data server 12 and reports the outcome of the installation, which may eventually be a failure. In this case, the remote data server can immediately re-plan a new communication with the mail processing device for another firmware upgrading. And finally, in a fifteenth step 228, the remote data server 12 updates the status of the mail processing device firmware.

If additional personalized files catalogues are scheduled on the remote data server 12 for the mail processing device 10 (for example when multiple successive firmware updates are scheduled by the remote data server), the mail processing device receives the next personalized files catalogue from the remote data server. The mail processing devices recognize on the mass storage device the files package corresponding to this new personalized files catalogue, and the process takes again from step 222 until the latest personalized files catalogue for the mail processing device update is received from the remote data server 12 by the mail processing device 10.

It must be noted that the communication for firmware update between the mail processing device 10 and the web servers 20 is always initiated by the mail processing device. This mechanism prevents any external computer system from initiating communication with the mail processing device and accessing or altering information within the mail processing device.

Such architecture is not limited to firmware updates, but can also support other file downloads onto the devices associated with commercial upgrades or with the on-going operation of the devices (slogans, rate files . . . ).

The invention claimed is:

1. A method for securely updating a firmware of a mail processing device from a remote data server, comprising the following steps
   the remote data server encrypting and splitting binary files corresponding to the firmware of the mail processing device to be updated and distributing the encrypted and split binary files from the remote data server to a plurality of download servers; and
   transferring from the remote data server to the mail processing device a personalized files catalogue including a list of said encrypted files with associated file addresses in said file download server and file decryption keys;
   the mail processing device retrieving each of said encrypted binary files from the file download servers, decrypting the binary files with said file decryption key and installing the associated decrypted binary files thereon;
   and once each of said encrypted files are decrypted with said file decryption keys and installed on the mail processing device, the mail processing device reporting the outcome of the updating to the remote data server to control the firmware of the mail processing device.

2. The method of claim 1, wherein:
   the remote data server prepares a list of binary files corresponding to the firmware of the mail processing device to update and encrypts them in order to distribute each of said encrypted files to file download servers connected to the remote data server,
   the remote data server prepares a personalized files catalogue including a files catalogue identification, said list of binary files, associated file addresses in said file download servers and file decryption keys in order to distribute said personalized files catalogue to the mail processing device,
   the mail processing device retrieves from the file download servers each of said encrypted files, decrypts them with the file decryption keys previously provided with the personalized files catalogue by the remote data server and installs the associated binary files into the mail processing device,
   the mail processing device connects to the remote data server and reports the outcome of the updating to the remote data server.

3. The method of claim 1, wherein:
   the remote data server prepares a list of binary files corresponding to the firmware of the mail processing device to update and encrypts them in order to distribute each of said encrypted files to file download servers connected to the remote data server,
   the remote data server prepares a personalized files catalogue including a files catalogue identification, said list of binary files, associated file addresses in said file download servers and file decryption keys in order to distribute said personalized files catalogue to the mail processing device,
   a user computer system connects to web servers connected with both the remote data server and the files download servers and providing into the web servers a web service application for downloading files and said files catalogue identification is entered into the web servers via this web service application for downloading files,
   the web service application for downloading files requests and retrieves from the remote data server the personalized files catalogue corresponding to said files catalogue identification, without the file decryption keys,
   the web service application for downloading files requests and retrieves from the file download servers each of said encrypted files corresponding to the personalized files catalogue,
   the user receives on the user computer system each of said encrypted files for download onto a mass storage device and plugs the mass storage device into the mail processing device,
   the mail processing device retrieves from the mass storage device each of said encrypted files, decrypts them with the file decryption keys previously provided with the personalized files catalogue by the remote data server and installs the associated binary files into the mail processing device,
   the mail processing device connects to the remote data server and reports the outcome of the updating to the remote data server.

4. The method of claim 3, characterized in that the web service application for downloading files packages said encrypted files into a single encrypted file to facilitate the download into the mass storage device.

5. The method of claim 1, characterized in that the number of file download servers is multiplied as much as necessary to minimize the duration of the remote firmware updates.

6. The method of claim 1, characterized in that each file is signed by the remote data server to allow the mail processing device to authenticate the file and verify its integrity.

7. A system for securely updating a firmware of a mail processing device from a remote data server comprising:
   file download servers connected to the remote data server for receiving from the remote data server encrypted binary files that are split, from a list of binary files corresponding to a firmware of the mail processing device to update,
   web servers providing a web service application for downloading files and connected both to the remote data server and the files download servers for retrieving the encrypted files associated with a personalized files catalogue retrieved by the mail processing device, from the remote data server,
   and a user computer system connected to the web servers for receiving the encrypted files for download onto a mass storage device to plug into the mail processing device,
   decrypting the encrypted files with file decryption keys previously provided with the personalized files catalogue to the mail processing device, by the remote data server and installing the files on the mail processing device before connecting to the remote data server for report the outcome of the installation.

8. The system according to claim 7, characterized in that the personalized files catalogue includes a files catalogue identification, said list of binary files, associated file addresses in said file download servers and said file decryption keys.

9. The system according to claim 7, characterized in that said mass storage device is a USB key.

10. The system according to claim 7, characterized in that said mail processing device is a franking machine or an inserter.

* * * * *